US008838030B2

(12) United States Patent
Liao et al.

(10) Patent No.: US 8,838,030 B2
(45) Date of Patent: Sep. 16, 2014

(54) BLUETOOTH EARPHONE

(75) Inventors: Jui-Chi Liao, Taipei (TW); Chi-Hsiang Chen, Taipei (TW); Che-Cheng Chang, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 363 days.

(21) Appl. No.: 13/243,054

(22) Filed: Sep. 23, 2011

(65) Prior Publication Data

US 2012/0244813 A1 Sep. 27, 2012

(30) Foreign Application Priority Data

Mar. 24, 2011 (CN) ...................... 2011 2 0083541 U

(51) Int. Cl.
*H04B 7/00* (2006.01)
*H04R 1/10* (2006.01)

(52) U.S. Cl.
CPC .......... *H04R 1/1091* (2013.01); *H04R 2420/07* (2013.01)
USPC .......................................................... 455/41.2

(58) Field of Classification Search
CPC .......................... H04R 1/1091; H04R 2420/07
USPC .......................................................... 455/41.2
See application file for complete search history.

(56) References Cited

U.S. PATENT DOCUMENTS

| | | | | |
|---|---|---|---|---|
| 7,747,003 | B2 * | 6/2010 | Regen et al. | 379/430 |
| 8,428,289 | B2 * | 4/2013 | Wengreen | 381/385 |
| 2006/0135223 | A1 * | 6/2006 | Kim | 455/575.2 |
| 2008/0310662 | A1 * | 12/2008 | Davidson et al. | 381/355 |
| 2011/0254964 | A1 * | 10/2011 | Zhang | 348/207.1 |

* cited by examiner

*Primary Examiner* — David Bilodeau
(74) *Attorney, Agent, or Firm* — Rosenberg, Klein & Lee

(57) ABSTRACT

A Bluetooth earphone includes a main body, an earpiece disposed at one side of the main body, an ear hanger, a power unit, and first and second rotating shafts. The ear hanger includes a first end portion disposed on the earpiece, a bent-back portion bent from the first end portion, and a second end portion extending from the bent-back portion. The power unit includes a battery set disposed removably on the second end portion of the ear hanger, and a transmission cable electrically connected to the main body and the battery set. The first rotating shaft unit connects the earpiece pivotally to the main body. The second rotating shaft unit connects the ear hanger pivotally to the earpiece. The Bluetooth earphone is adjustable to be worn on the left or right ear of a user, and is convenient to replace the battery set.

31 Claims, 8 Drawing Sheets

BLUETOOTH EARPHONE

CROSS-REFERENCE TO RELATED APPLICATION

This application claims priority of Chinese Application No. 201120063541.7, filed on Mar. 24, 2011.

BACKGROUND OF THE INVENTION

1. Field of the Invention

This invention relates to a Bluetooth earphone, and more particularly to a Bluetooth earphone that is adjustable to be worn on the left or right ear of a user according to needs and that is convenient to replace a battery set.

2. Description of the Related Art

Bluetooth wireless communication technique has the advantages of wide signal-receiving angle, power-saving, and high transmission speed.

A Bluetooth earphone can cooperate with a mobile phone to avoid limitation in the length of a transmission cable and a vehicle accident occurred due to use of the mobile Phone during driving. Hence, Bluetooth earphones have been widely used.

An improved Bluetooth earphone, such as that disclosed in US20060147078A1 and US20030186179A1, is adjustable to be worn on the left or right ear of a user according to needs. However, adjustment taught by US20060147078A1 involves in disassembly and reassembly of the Bluetooth earphone, which easily results in sway of components of the Bluetooth earphone. To solve the disassembly and reassembly problem, US20080188179A1 includes an ear hook capable of rotating relative to an earphone body about two axes. However, since no rotational-angle limiting devices are disposed among the rotating components of the Bluetooth earphone, damage is easily caused to the rotating components, and transmission cables are easily entangled.

Another drawback of a conventional Bluetooth earphone is that, according to an increasing tendency toward minimization, most of Bluetooth earphones have a low battery capacity. In such a case, call duration is reduced, so that a user may be unable to receive an important call. Moreover, to replace a battery set, typically, there is a need to disassemble the earphone by removing tongues from grooves. Frequent engagement and disengagement of the tongues and the grooves easily result in breakage of the tongues.

SUMMARY OF THE INVENTION

One object of this invention is to provide a Bluetooth earphone that is adjustable to be worn on the left or right ear of a user and that is convenient to replace a battery unit.

Another object of this invention is to provide a Bluetooth earphone that is adjustable to be worn on the left or right ear of a user and that includes at least one rotational-angle limiting device disposed between two rotating components, so as to prevent damage caused to the rotating components and entanglement of transmission cables.

According to this invention, a Bluetooth earphone includes a main body, an earpiece disposed at one side of the main body, an ear hanger, a power unit, and first and second rotating shafts. The ear hanger includes a first end portion disposed on the earpiece, a bent-back portion bent from the first end portion, and a second end portion extending from the bent-back portion. The power unit includes a battery set disposed removably on the second end portion of the ear hanger, and a transmission cable electrically connected to the main body and the battery set. The first rotating shaft unit connects the earpiece pivotally to the main body. The second rotating shaft unit connects the ear hanger pivotally to the earpiece. Due to presence of the first and second rotating shaft units, the Bluetooth earphone is adjustable to be worn on the left or right ear of a user. Since the battery unit is disposed removably on the ear hanger, it can be replaced conveniently.

Preferably, a first extension portion is disposed on the earpiece, and is rotatable along a first rotation path, and a projecting block is disposed on the main body and in the first rotation path. During rotation of the earpiece relative to the main body in a direction, when the first extension portion comes into contact with the projecting block, further rotation of the earpiece in the direction can be prevented.

Preferably, the second rotating shaft unit includes a second rotating shaft having a second extension portion that is rotatable along a second rotation path, and the earpiece includes two stop portions disposed in the second rotation path, such that the second extension portion is limited to rotate between the two stop portions. When the second extension portion is rotated to contact either of the stop portions, further rotation thereof is prevented.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
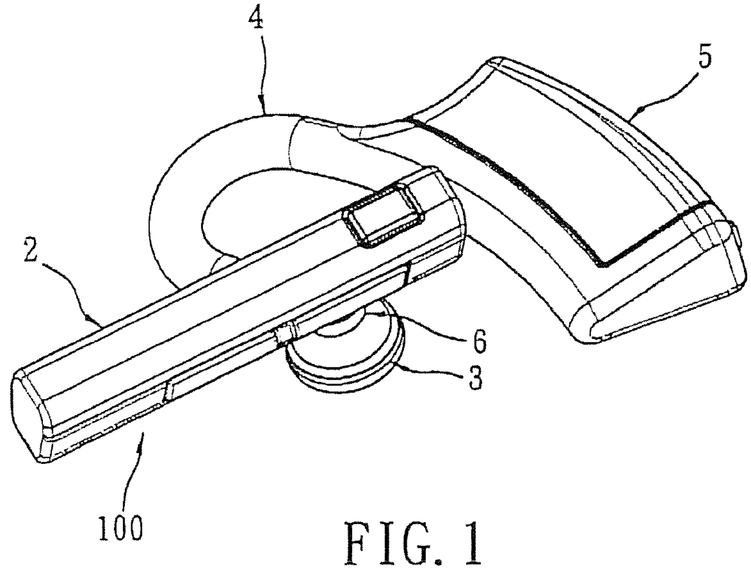
FIG. 1 is a perspective view of the preferred embodiment of a Bluetooth earphone according to this invention when in a first state.
Figure 2:
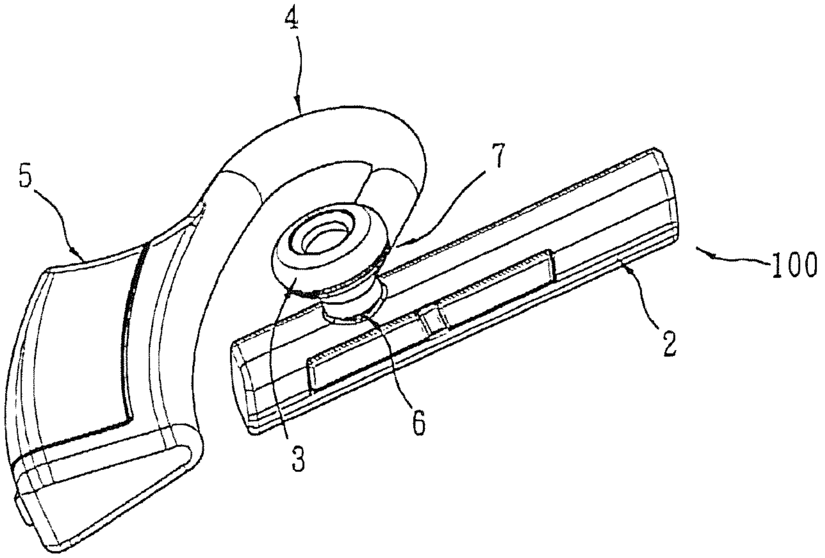
FIG. 2 is a perspective view of the preferred embodiment, viewed at another angle.
Figure 3:
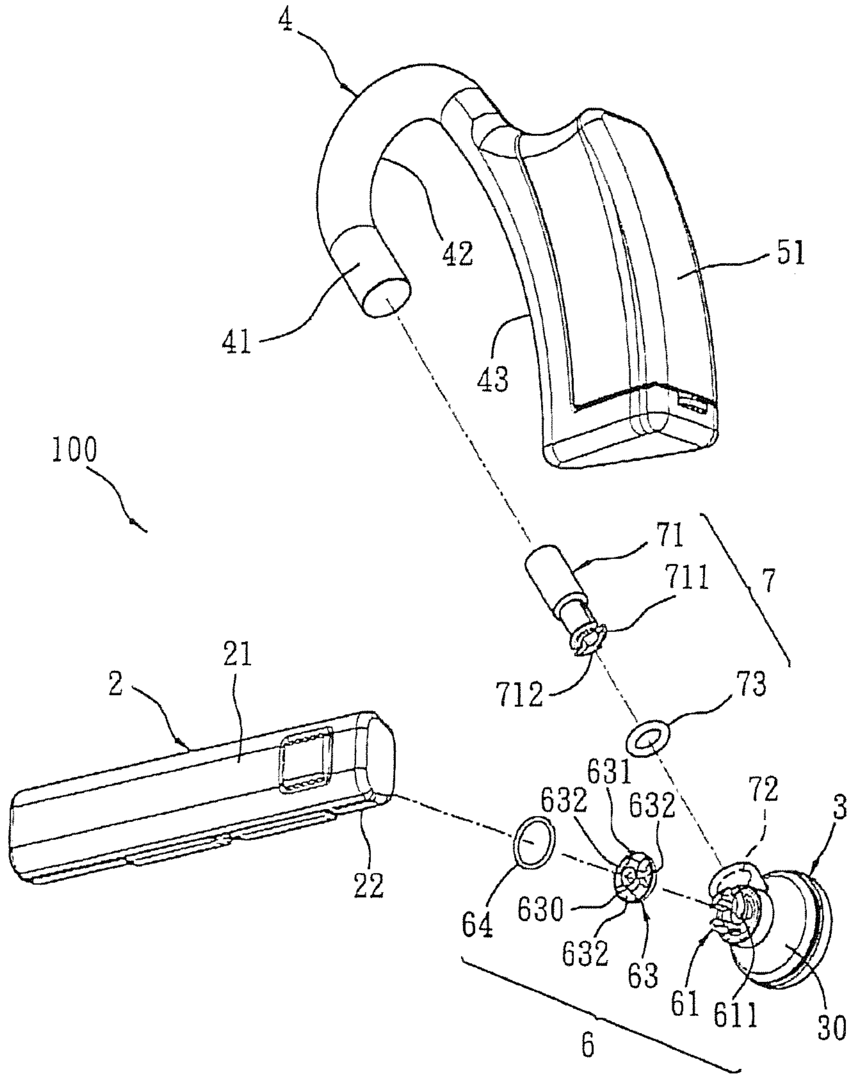
FIG. 3 is an exploded perspective view of the preferred embodiment.
Figure 10:
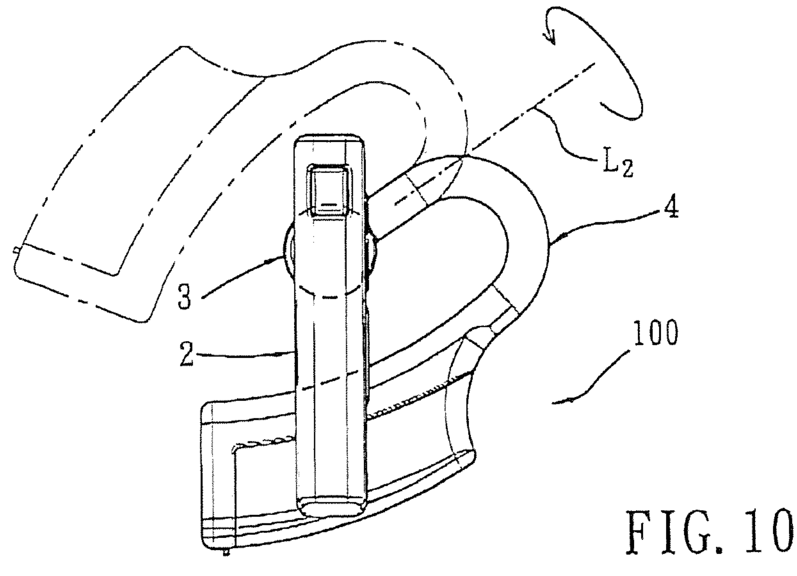
FIG. 10 is a schematic perspective view of the preferred embodiment, illustrating rotation of an ear hanger relative to the earpiece about a second axis.
Figure 11:
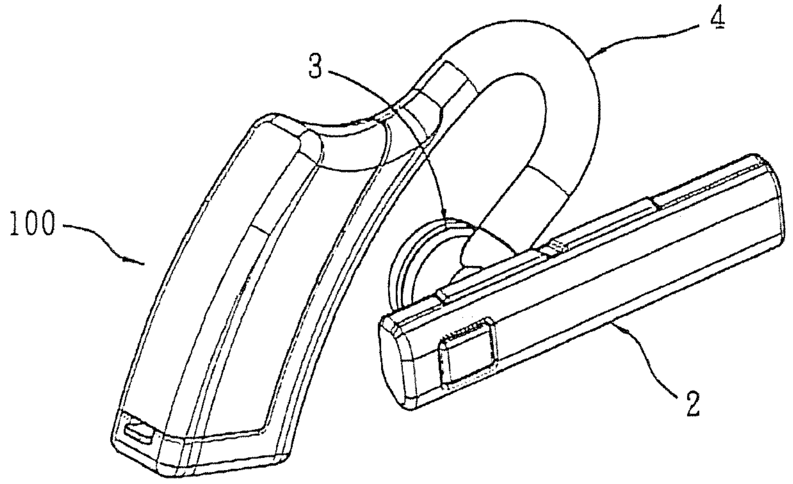
FIG. 11 is a perspective view of the preferred embodiment when in a second state.

Referring to FIGS. 1, 2, and 3, the preferred embodiment of a Bluetooth earphone 100 according to this invention is adjustable to convert between a first state shown in FIG. 1 and a second state shown in FIG. 10. In the first state, the earphone 100 can be worn on the left ear of a user. In the second state, the earphone 100 can be worn on the right ear of the user. The earphone 100 includes a main body 2 for receiving and emitting Bluetooth signals, an earpiece 3 disposed at one side of the main body 2 and within the left or right ear of the user, an ear hanger 4 hung on the left or right ear, a power unit 5 for supplying electric power required for operation of the main body 2, and a pair of first and second rotating shaft units 6, 7.

The main body 2 has a pair of first and second halves 21, 22 that are interconnected removably.

The ear hanger 4 includes a first end portion 41 disposed on the earpiece 3, a bent-back portion 42 bent from the first end portion 41, and a second end portion 43 extending from the bent-back portion 42. In this embodiment, the ear hanger 4 is an inverted U-shaped tube, and is hung on the left or right ear at the bent-back portion 42. In actual use, the first end portion 41 is disposed in front of the left or right ear, and the second end portion 42 is disposed behind the left or right ear.

Figure 4:
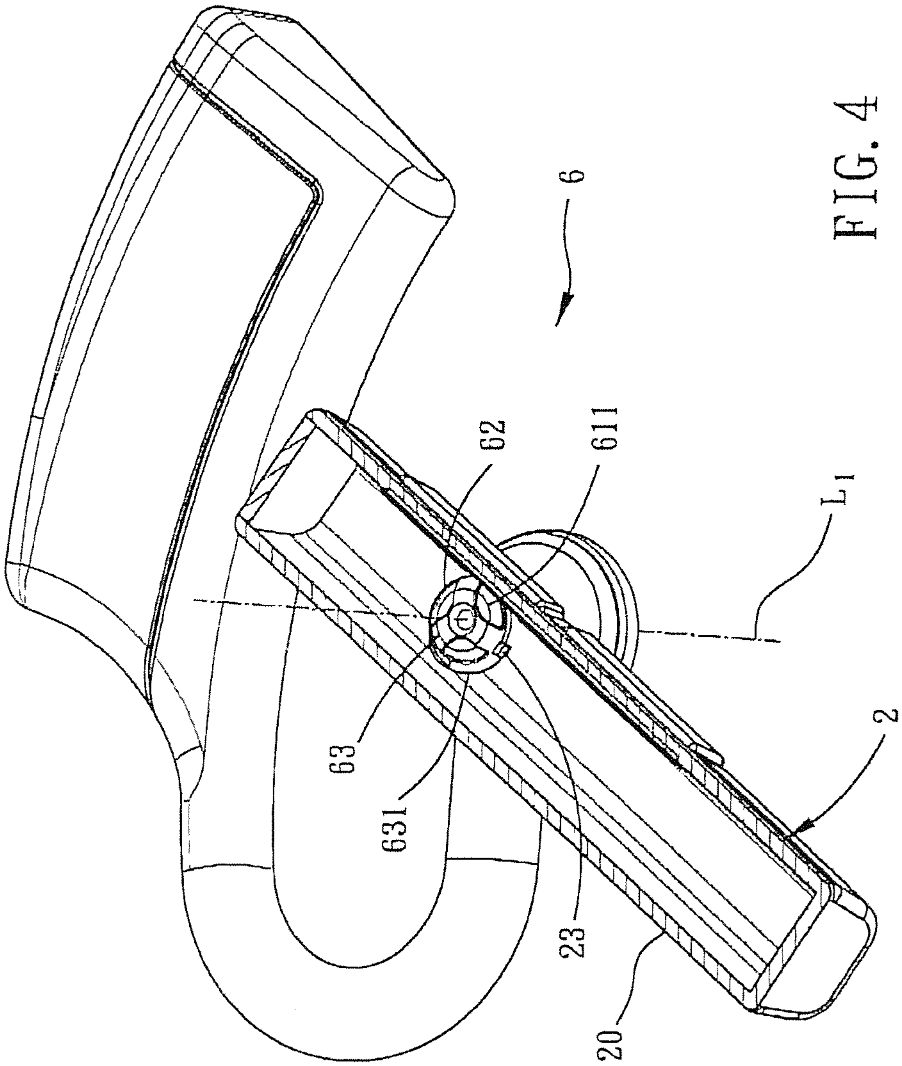
FIG. 4 is a perspective cutaway view of the preferred embodiment, illustrating a first rotating shaft unit.

Referring to FIGS. 3 and 4, the earphone 100 can be selectively worn on the left or right ear through cooperation between the first and second rotating shaft units 6, 7. The first rotating shaft unit 6 includes a first pivot hole 62 formed in the second half 22 of the main body 2, and a first rotating shaft 61 connected fixedly to the earpiece 3 for connecting the earpiece 3 pivotally to the main body 2. The first rotating shaft 61 is rotatable relative to the main body 2 about a first axis (L1) extending through the center of the first pivot hole 62. The first rotating shaft 61 are provided with a plurality of first retaining hocks 611 extending therefrom and spaced apart from each other. Each of the first retaining hooks 611 extends through the first pivot hole 62, and has a barb end 612 (see FIG. 6) disposed outwardly of the first pivot hole 62, so as to allow for rotation of the main body 2 about the first rotating shaft 61, while preventing removal of the main body 2 from the first rotating shaft 61. As such, the main body 2 can rotate relative to the earpiece 3 about the first axis (L1).

To interconnect the earpiece 3 and the main body 2 firmly in such a manner to allow positioning of the main body 2 relative to the earpiece 3, the first rotating shaft unit 6 further includes a limiting member 63. During assembly of the main body 2 and the earpiece 3, the first retaining hooks 611 are first moved into the second half 22 of the main body 2 through the first pivot hole 62 until the barb ends 612 project outwardly from the first pivot hole 62. Next, the limiting member 63 is inserted into a space among the first retaining hooks 611 in such a manner that it abuts against the first retaining hooks 611 and the barb ends 612 of the first retaining hooks 611 engage respectively and fittingly three non-circular holes 632 (see FIG. 3) in the limiting member 63, so as to allow for co-rotation of the limiting member 63 with the earpiece 3, while preventing deformation of the first retaining hooks 611, thereby retaining the main body 2 on the first retaining hooks 611 and, thus, the earpiece 3. Thereafter, the first half 21 is assembled to the second half 22. In this embodiment, the first retaining hooks 611 are in contact with an inner wall surface of the main body 2 defining the first pivot hole 62. The limiting member 63 has a body portion 630 formed with the non-circular holes 632, and a first extension portion 631 extending outwardly from an outer periphery of the body portion 630, disposed outwardly of the space defined among the first retaining hooks 611, and rotatable relative to the main body 2 along a first rotation path. The main body 2 includes a hollow outer housing 20, and a projecting block 23 extending from an inner surface of the outer housing 20. The projecting block 23 is adjacent to the first pivot hole 62, and is disposed in the first rotation path, so as to limit an angle of rotation of the main body 2 about the first axis (L1). In this embodiment, the maximum rotational angle of the earpiece 3 and the limiting member 63 relative to the main body 2 is 225°. That is, the first extension portion 631 extends an angle of 135° along the outer periphery of the limiting member 63 so that, when the first extension portion 631 is rotated to contact the projecting block 23, further rotation of the first extension portion 631 can be prevented. As such, the first extension portion 631 cooperates with the projecting block 23 to constitute a rotational-angle limiting device for preventing damage caused to the main body 2 and the first rotating shaft unit 6 during relative rotation of the main body 2 and the earpiece 3.

Figure 5:
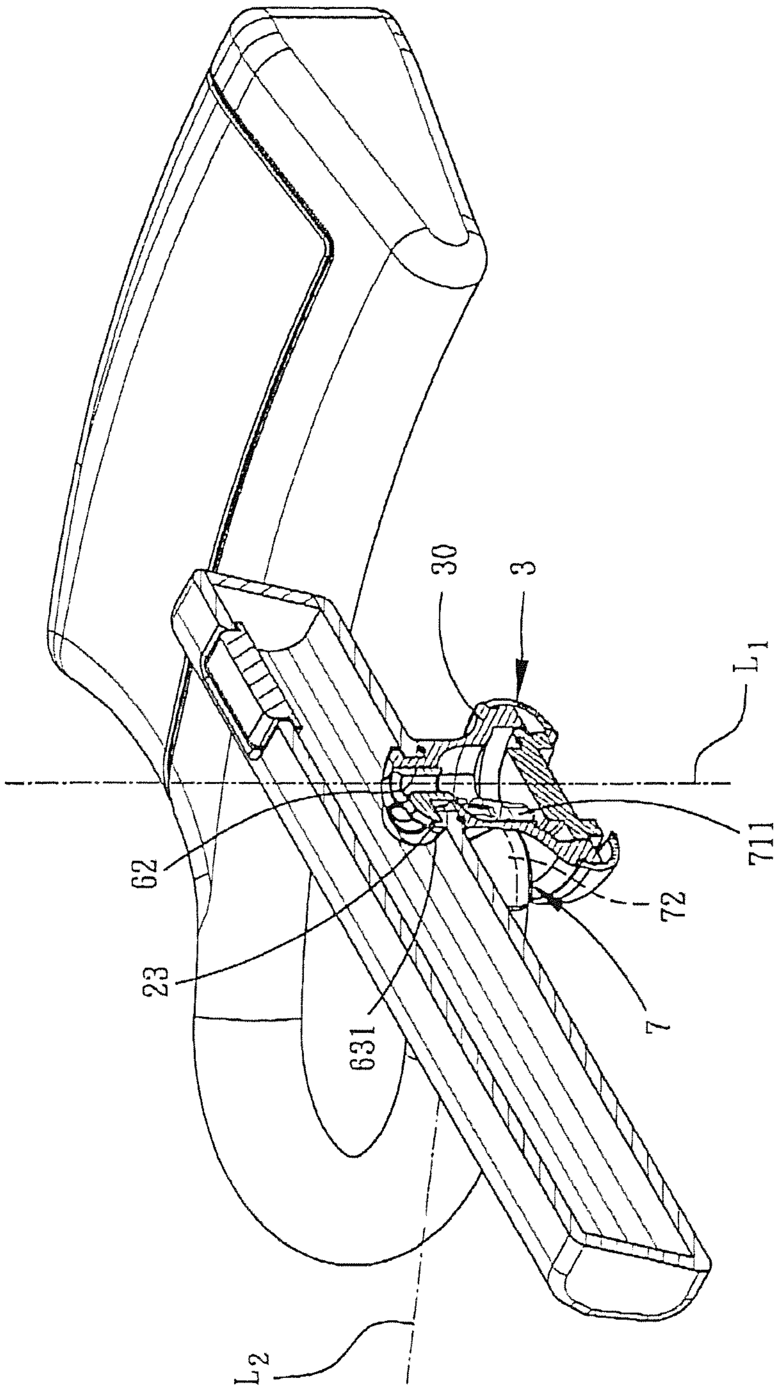
FIG. 5 is a perspective cutaway view of the preferred embodiment, illustrating a second rotating shaft unit.
Figure 6:
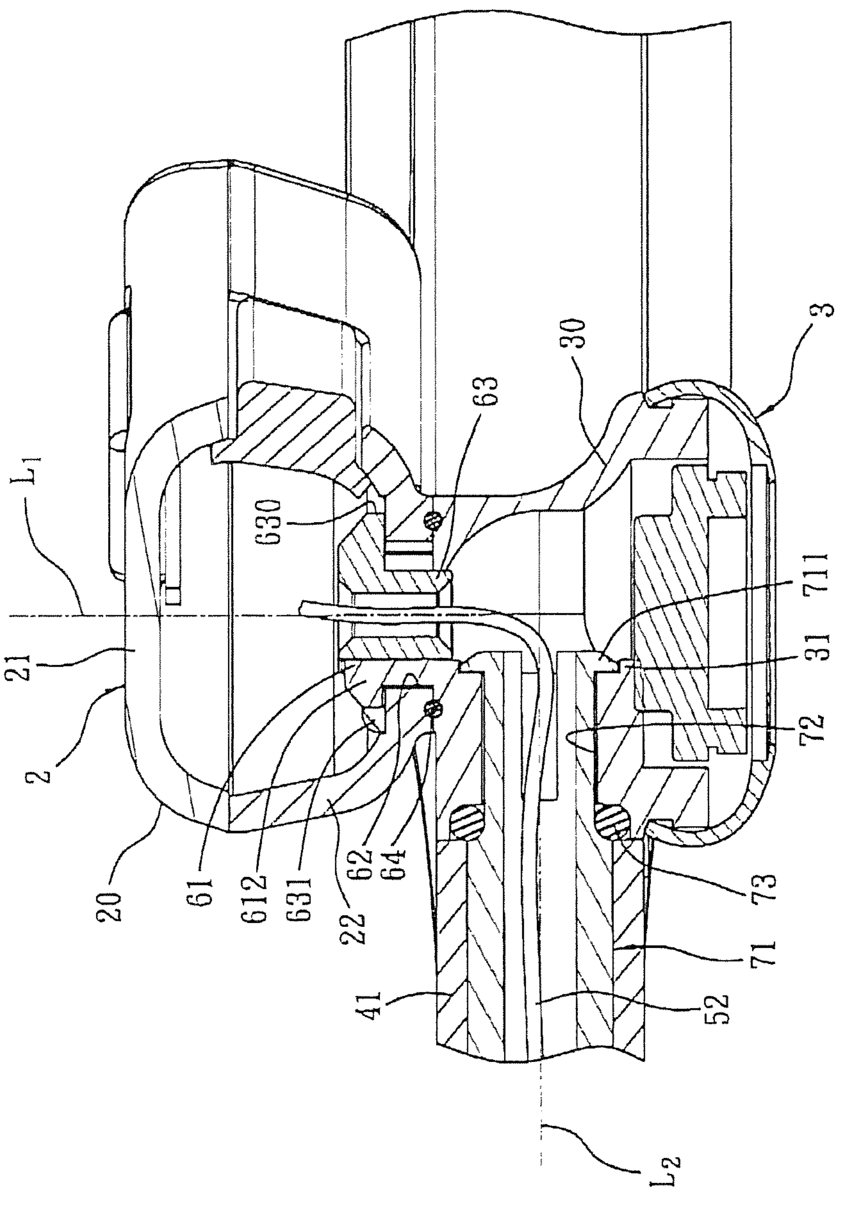
FIG. 6 is a partly sectional view of the preferred embodiment, illustrating arrangement of the first and second rotating shaft units.

With further reference to FIGS. 5 and 6, the second rotating shaft unit 7 includes a second pivot hole 72 formed in the earpiece 3, and a second rotating shaft 71 connected fixedly to the first end portion 41 of the ear hanger 4 for connecting the ear hanger 4 pivotally to the earpiece 3. The second rotating shaft 71 is rotatable relative to the earpiece 3 about a second axis (L2) that extends through the center of the second pivot hole 72 and that is perpendicular to the first axis (L1). The second rotating shaft 72 is provided with a plurality of second retaining hooks 711 extending therefrom and spaced apart from each other. Each of the second retaining hooks 711 extends through the second pivot hole 72 in the earpiece 3, and has a barb end projecting outwardly from the second pivot hole 72, so as to allow for rotation of the ear hanger 4 relative to the earpiece 3 about the second axis (L2), while preventing removal of the ear hanger 4 from the earpiece 3.

It should be noted that, the first and second retaining hooks 611, 711 are flexible. When the first retaining hooks 611 are inserted into the first pivot hole 62, they are deformed to flex toward each other to pass through the first pivot hole 62. As soon as the first bar ends 612 of the first retaining hooks 611 pass past the first pivot hole 62, they return to their original shapes so as to retain the main body 2 on the earpiece 3. The second retaining hooks 711 are engaged to the second pivot hole 72 in a similar manner so as to retain the earpiece 3 on the ear hanger 4.

To position the ear hanger 4 relative to the earpiece 3, the second rotating shaft 71 further includes a second extension portion 712 extending outwardly from one of the second retaining hooks 711. The earpiece 3 includes a hollow seat body 30 and a pair of stop portions 31 disposed on an inner surface of the seat body 30 and adjacent to the second pivot hole 72. The stop portions 31 are disposed in the second rotation path so as to limit the second extension portion 712 to rotate between the stop portions 31, thereby reducing damage caused to the ear hanger 4 and the second rotating shaft unit 7. In this embodiment, the maximum rotational angle of the second extension portion 712 is 180°.

To reduce wear occurring on the earpiece 3 and the main body 2 during relative rotation thereof, the first rotating shaft unit 6 further includes an elastic member 64 sleeved on the first rotating shaft 61 and clamped between the main body 2 and the earpiece 3. Similarly, the second rotating shaft unit 7 further includes an elastic member 73 sleeved on the second rotating shaft 71 and clamped between the first end portion 41 of the ear hanger 4 and the earpiece 3. In this embodiment, the elastic members 64, 73 are but not limited to a ring made of rubber.

Figure 7:
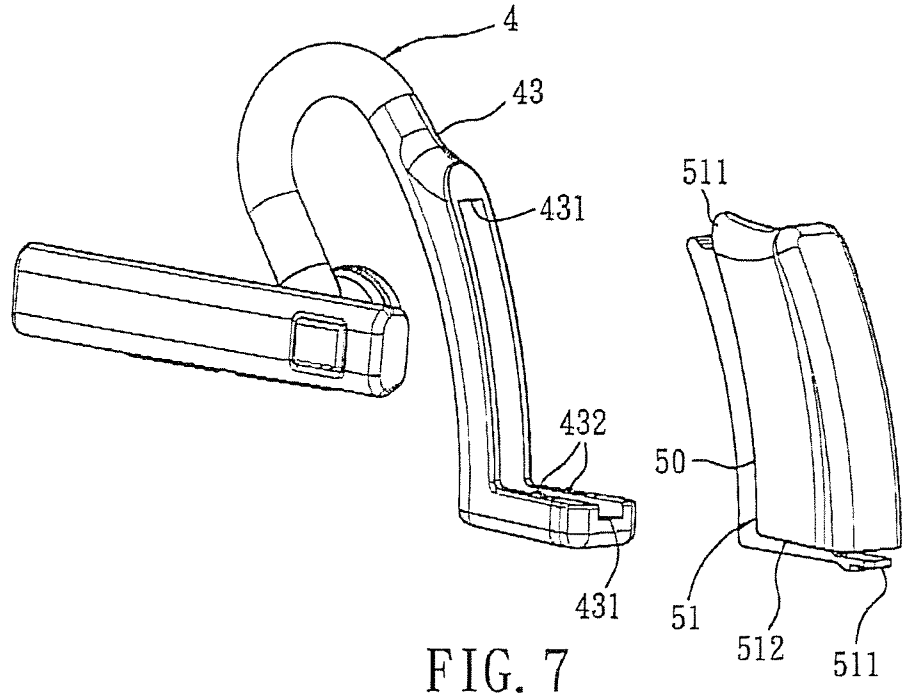
FIG. 7 is a partly exploded perspective view of the preferred embodiment, illustrating how a battery unit is removed from the remaining portion of the earphone.

With further reference to FIG. 7, the power unit 5 includes a battery set 51 disposed removably on the second end portion 43 of the ear hanger 4, and a transmission cable 52 electrically connected to the main body 2 and the battery set 61. The battery set 51 includes a housing portion 50, and two first engaging portions 511 disposed respectively at two opposite sides of the housing portion 50. The second end portion 43 of the ear hanger 4 is formed with two second engaging portions 431 engaging the first engaging portions 611, respectively, for connecting the battery set 51 to the ear hanger 4. In this embodiment, the first engaging portions 511 are a retaining hook and a retaining tongue, and the second engaging portions 431 are a hook groove engageable with the retaining hook, and a groove engageable with the retaining tongue. During assembly, the engagement between the retaining hook and the hook groove is carried out prior to engagement between the retaining tongue and the groove.

To supply electric power from the battery set 51 to the main body 2, the battery set 51 has a power-supplying end 512, and the second end portion 43 of the ear hanger 4 has a contact end 432 in electrical contact with the power-supplying end 512. Each of the first and second rotating shafts 61, 71 is configured as a tube having two open ends. The transmission cable 52 of the power unit 5 extends from the main body 2 and through the first pivot hole 62, the first rotating shaft 61, the second pivot hole 72, and the second rotating shaft 71 to electrically connect with the contact end 432 of the second end portion 43 of the ear hanger 4.

It should be noted that, the ear hanger 4 is also configured as a tube having two open ends to allow for extension of the transmission cable 52 therein. As such, the whole transmission cable 52 is not exposed outwardly of the earpiece 3 and the ear hanger 4, so as to avoid entanglement or breakage of the transmission cable 52 during use.

Figure 8:
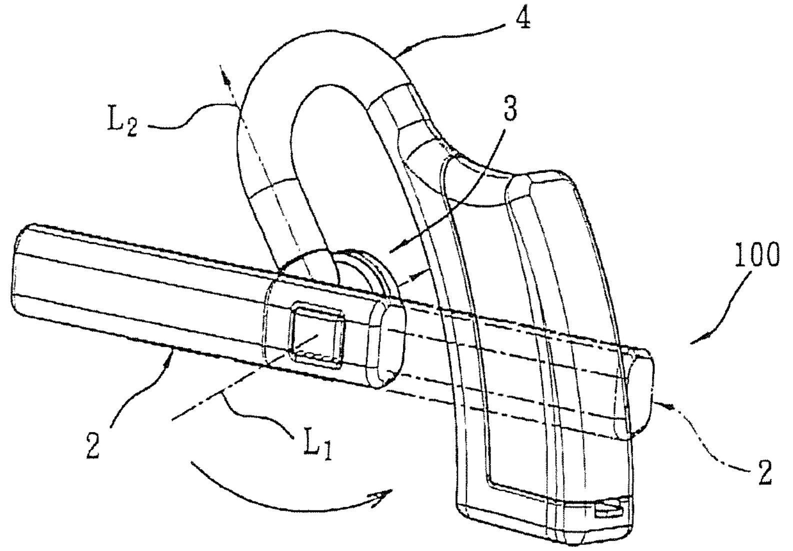
FIG. 8 is a schematic perspective view of the preferred embodiment, illustrating rotation of a main body relative to an earpiece about a first axis.
Figure 9:
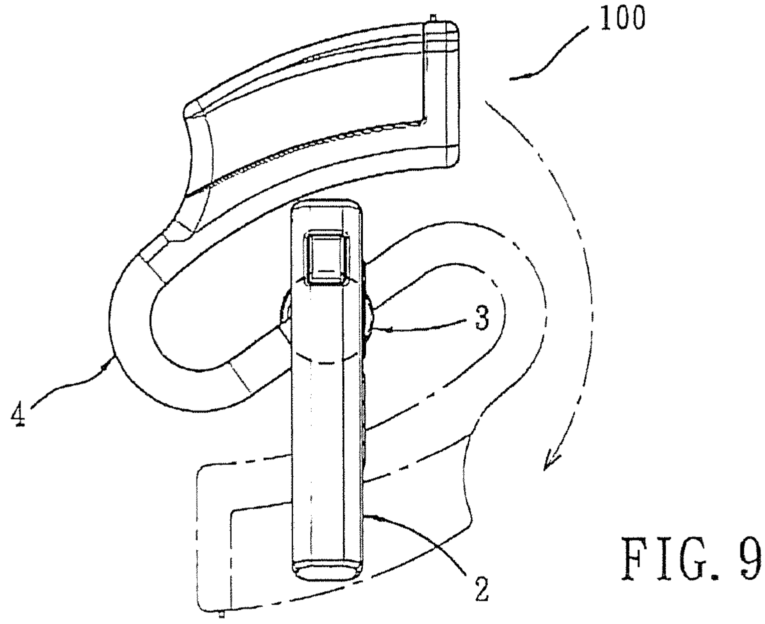
FIG. 9 is a schematic perspective view of the preferred embodiment, illustrating rotation of the earpiece relative to the main body about the first axis.

Referring to FIGS. 8 to 11, when it is desired to change the earphone 100 from the first state to the second state, the main body 2 is rotated relative to the earpiece 3 about the firs: axis (L1) from the position shown by the solid lines in FIG. 8 to the position shown by the phantom lines in FIG. 8 by an angle of 180°. Or, the earpiece 3 is rotated relative to the main body 2 about the first axis (L1) from the position shown by the solid lines in FIG. 9 to the position shown by the phantom lines in FIG. 9 by an angle of 180°. Subsequently, the ear hanger 4 is rotated relative the earpiece 3 about the second axis (L2) from the position shown by the solid lines in FIG. 10 to the position shown by the phantom lines in FIG. 10 by an angle of 180°. When the ear hanger 4 is disposed at the position shown by the phantom lines in FIG. 10 relative to the earpiece 3, the earphone 100 can be worn on the right ear.

It should be noted that, if the first and second rotating shaft 61, 71 can rotate an angle of more than 360°, damage will be caused to the rotating components of the earphone 100, and the transmission cable 52 will be entangled and broken. Due to the presence of the rotational-angle limiting devices including the first and second extension portions 631, 712, the projecting block 23, and the stop portions 31, the first and second rotating shaft 61, 71 cannot rotate an angle of more than 360.

In view of the above, the earphone 100 of this invention has the following advantages:

1. Since the first rotating shaft unit 6 is connected between the main body 2 and the earphone 3, and since the second rotating shaft unit 7 is connected between the earpiece 3 and the ear hanger 4, the earphone 100 can be adjusted to be selectively worn on the left or right ear of the user.
2. Due to the elastic members 64, 73, wear between the main body 2 and the earpiece 3 and between the earpiece 3 and the ear hanger 4 can be avoided.
3. The transmission cable 52 extends in the main body 2, the first rotating shaft 61, the earpiece 3, the second rotating shaft 71, and the ear hanger 4, so as to prevent entanglement and breakage of the transmission cable 52.
4. Since the battery set 51 is disposed removably on the second end portion 43 of the ear hanger 4, it can be removed conveniently for replacement or recharge without disassembly and reassembly of the whole earphone 100.

With this invention thus explained, it is apparent that numerous modifications and variations can be made without departing from the scope and spirit of this invention. It is therefore intended that this invention be limited only as indicated by the appended claims.

We claim:

1. A Bluetooth earphone comprising:

a main body adapted for receiving and emitting Bluetooth signals;

an earpiece disposed at one side of said main body;

an ear hanger comprising a first end portion disposed on said earpiece, a bent-back portion bent from said first end portion, and a second end portion extending from said bent-back portion;

a power unit comprising a battery set and a transmission cable, said battery set being disposed removably on said second end portion of said ear hanger and being electrically connected to said main body by said transmission cable;

a first rotating shaft unit comprising a first rotating shaft for connecting said earpiece pivotally to said main body; and a second rotating shaft unit comprising a second rotating shaft for connecting said first end portion of said ear hanger pivotally to said earpiece;

wherein said first rotating shaft unit has a first pivot hole formed in said main body for receiving rotatably said first rotating shaft, said first rotating shaft being provided with a plurality of first retaining hooks extending therefrom and spaced apart from each other, said first retaining hooks extending through said first pivot hole in said main body in such a manner to allow for rotation of said main body relative to said earpiece about said first rotating shaft, while preventing removal of said main body from said first rotating shaft.

2. The Bluetooth earphone as claimed in claim 1, wherein said first rotating shaft unit further comprises a limiting member inserted into a space among said first retaining hooks so as to force said first retaining hooks to abut against an inner wall surface of said main body.

3. The Bluetooth earphone as claimed in claim 2, wherein said limiting member comprises an outer periphery, and a first extension portion extending outwardly from said outer periphery and rotatable along a first rotation path, said main body comprises a hollow outer housing having an inner surface, and a projecting block extending from said inner surface, said projecting block being adjacent to said first pivot hole and being disposed in said first rotation path so as to limit an angle of rotation of said main body about said first rotating shaft.

4. The Bluetooth earphone as claimed in claim 3, wherein said second rotating shaft unit has a second pivot hole formed in said earpiece for receiving said second rotating shaft rotatably, said second rotating shaft being provided with a plurality of second retaining hooks extending therefrom and spaced apart from each other, said second retaining hooks extending through said second pivot hole in such a manner to allow for rotation of said earpiece about said second rotating shaft, while preventing removal of said earpiece from said second rotating shaft.

5. Bluetooth earphone as claimed in claim 4, wherein said second rotating shaft comprises a second extension portion extending outwardly from one of said second retaining hooks, and said earpiece comprises a hollow seat body and a pair of stop portions that are formed on an inner surface of said earpiece and that are adjacent to said second pivot hole, said stop portions being disposed in said second rotation path for limiting an angle of rotation of said ear hanger about said second rotating shaft.

6. The Bluetooth earphone as claimed in claim 1, wherein said first rotating shaft unit further comprises an elastic member, said elastic member being sleeved on said first rotating shaft and being clamped between said main body and said earpiece.

7. The Bluetooth earphone as claimed in claim 1, wherein said second rotating shaft unit further comprises an elastic member, said elastic member being sleeved on said second rotating shaft and being clamped between said first end of said ear hanger and said earpiece.

8. The Bluetooth earphone as claimed in claim 1, wherein said first rotating shaft unit has a first pivot hole formed in said main body for receiving said first rotating shaft rotatably, and said second rotating shaft unit has a second pivot hole formed in said earpiece for receiving said second rotating shaft rotatably, said first rotating shaft being rotatable relative to said main body about a first axis that extends through a center of said first pivot hole, said second rotating shaft being rotatable relative to said earpiece about a second axis that extends through a center of said second pivot hole and that is perpendicular to said first axis.

9. The Bluetooth earphone as claimed in claim 1, wherein said battery set comprises a housing portion and two first engaging portions disposed respectively at two opposite sides of said housing portion, said second end portion of said ear hanger being formed with two second engaging portions engaging said first engaging portions, respectively, for connecting said battery set removably to said ear hanger.

10. The Bluetooth earphone as claimed in claim 1, wherein said battery set of said power unit comprises a power-supplying end, and said second end portion of said ear hanger comprises a contact end in electrical contact with said power-supplying end.

11. The Bluetooth earphone as claimed in claim 10, wherein each of said first and second rotating shafts is tubular, and has two open ends, said transmission cable of said power unit extending from said main body and through said first pivot hole, said first rotating shaft, said second pivot hole, and said second rotating shaft to electrically connect with said contact end of said second end portion of said ear hanger.

12. A Bluetooth earphone comprising:

a main body adapted for receiving and emitting Bluetooth signals;

an earpiece disposed at one side of said main body;

an ear hanger comprising a first end portion disposed on said earpiece, a bent-back portion bent from said first end portion, and a second end portion extending from said bent-back portion;

a power unit comprising a battery set and a transmission cable, said battery set being disposed removably on said second end portion of said ear hanger and being electrically connected to said main body by said transmission cable;

a first rotating shaft unit comprising a first rotating shaft for connecting said earpiece pivotally to said main body; and a second rotating shaft unit comprising a second rotating shaft for connecting said first end portion of said ear hanger pivotally to said earpiece;

wherein said first rotating shaft unit further comprises an elastic member, said elastic member being sleeved on said first rotating shaft and being clamped between said main body and said earpiece.

13. The Bluetooth earphone as claimed in claim 12, wherein said first rotating shaft unit has a first pivot hole formed in said main body for receiving rotatably said first rotating shaft, said first rotating shaft being provided with a plurality of first retaining hooks extending therefrom and spaced apart from each other, said first retaining hooks extending through said first pivot hole in said main body in such a manner to allow for rotation of said main body relative to said earpiece about said first rotating shaft, while preventing removal of said main body from said first rotating shaft.

14. The Bluetooth earphone as claimed in claim 13, wherein said first rotating shaft unit further comprises a limiting member inserted into a space among said first retaining hooks so as to force said first retaining hooks to abut against an inner wall surface of said main body.

15. The Bluetooth earphone as claimed in claim 14, wherein said limiting member comprises an outer periphery, and a first extension portion extending outwardly from said outer periphery and rotatable along a first rotation path, said main body comprises a hollow outer housing having an inner surface, and a projecting block extending from said inner surface, said projecting block being adjacent to said first pivot hole and being disposed in said first rotation path so as to limit an angle of rotation of said main body about said first rotating shaft.

16. The Bluetooth earphone as claimed in claim 15, wherein said second rotating shaft unit has a second pivot hole formed in said earpiece for receiving said second rotating shaft rotatably, said second rotating shaft being provided with a plurality of second retaining hooks extending therefrom and spaced apart from each other, said second retaining hooks extending through said second pivot hole in such a manner to allow for rotation of said earpiece about said second rotating shaft, while preventing removal of said earpiece from said second rotating shaft.

17. Bluetooth earphone as claimed in claim 16, wherein said second rotating shaft comprises a second extension portion extending outwardly from one of said second retaining hooks, and said earpiece comprises a hollow seat body and a pair of stop portions that are formed on an inner surface of said earpiece and that are adjacent to said second pivot hole, said stop portions being disposed in said second rotation path for limiting an angle of rotation of said ear hanger about said second rotating shaft.

18. The Bluetooth earphone as claimed in claim 12, wherein said first rotating shaft unit has a first pivot hole formed in said main body for receiving said first rotating shaft rotatably, and said second rotating shaft unit has a second pivot hole formed in said earpiece for receiving said second rotating shaft rotatably, said first rotating shaft being rotatable relative to said main body about a first axis that extends through a center of said first pivot hole, said second rotating shaft being rotatable relative to said earpiece about a second axis that extends through a center of said second pivot hole and that is perpendicular to said first axis.

19. The Bluetooth earphone as claimed in claim 12, wherein said battery set comprises a housing portion and two first engaging portions disposed respectively at two opposite sides of said housing portion, said second end portion of said ear hanger being formed with two second engaging portions engaging said first engaging portions, respectively, for connecting said battery set removably to said ear hanger.

20. The Bluetooth earphone as claimed in claim 12, wherein said battery set of said power unit comprises a power-supplying end, and said second end portion of said ear hanger comprises a contact end in electrical contact with said power-supplying end.

21. The Bluetooth earphone as claimed in claim 20, wherein each of said first and second rotating shafts is tubular, and has two open ends, said transmission cable of said power unit extending from said main body and through said first pivot hole, said first rotating shaft, said second pivot hole, and said second rotating shaft to electrically connect with said contact end of said second end portion of said ear hanger.

22. A Bluetooth earphone comprising:

a main body adapted for receiving and emitting Bluetooth signals;

an earpiece disposed at one side of said main body;

an ear hanger comprising a first end portion disposed on said earpiece, a bent-back portion bent from said first end portion, and a second end portion extending from said bent-back portion;

a power unit comprising a battery set and a transmission cable, said battery set being disposed removably on said second end portion of said ear hanger and being electrically connected to said main body by said transmission cable;

a first rotating shaft unit comprising a first rotating shaft for connecting said earpiece pivotally to said main body; and a second rotating shaft unit comprising a second rotating shaft for connecting said first end portion of said ear hanger pivotally to said earpiece;

wherein said second rotating shaft unit further comprises an elastic member, said elastic member being sleeved on said second rotating shaft and being clamped between said first end of said ear hanger and said earpiece.

23. The Bluetooth earphone as claimed in claim 22, wherein said first rotating shaft unit has a first pivot hole formed in said main body for receiving rotatably said first rotating shaft, said first rotating shaft being provided with a plurality of first retaining hooks extending therefrom and spaced apart from each other, said first retaining hooks extending through said first pivot hole in said main body in such a manner to allow for rotation of said main body relative to said earpiece about said first rotating shaft, while preventing removal of said main body from said first rotating shaft.

24. The Bluetooth earphone as claimed in claim 23, wherein said first rotating shaft unit further comprises a limiting member inserted into a space among said first retaining hooks so as to force said first retaining hooks to abut against an inner wall surface of said main body.

25. The Bluetooth earphone as claimed in claim 24, wherein said limiting member comprises an outer periphery, and a first extension portion extending outwardly from said outer periphery and rotatable along a first rotation path, said main body comprises a hollow outer housing having an inner surface, and a projecting block extending from said inner surface, said projecting block being adjacent to said first pivot hole and being disposed in said first rotation path so as to limit an angle of rotation of said main body about said first rotating shaft.

26. The Bluetooth earphone as claimed in claim 25, wherein said second rotating shaft unit has a second pivot hole formed in said earpiece for receiving said second rotating shaft rotatably, said second rotating shaft being provided with a plurality of second retaining hooks extending therefrom and spaced apart from each other, said second retaining hooks extending through said second pivot hole in such a manner to allow for rotation of said earpiece about said second rotating shaft, while preventing removal of said earpiece from said second rotating shaft.

27. Bluetooth earphone as claimed in claim 26, wherein said second rotating shaft comprises a second extension portion extending outwardly from one of said second retaining hooks, and said earpiece comprises a hollow seat body and a pair of stop portions that are formed on an inner surface of said earpiece and that are adjacent to said second pivot hole, said stop portions being disposed in said second rotation path for limiting an angle of rotation of said ear hanger about said second rotating shaft.

28. The Bluetooth earphone as claimed in claim 22, wherein said first rotating shaft unit has a first pivot hole formed in said main body for receiving said first rotating shaft rotatably, and said second rotating shaft unit has a second pivot hole formed in said earpiece for receiving said second rotating shaft rotatably, said first rotating shaft being rotatable relative to said main body about a first axis that extends through a center of said first pivot hole, said second rotating shaft being rotatable relative to said earpiece about a second axis that extends through a center of said second pivot hole and that is perpendicular to said first axis.

29. The Bluetooth earphone as claimed in claim 22, wherein said battery set comprises a housing portion and two first engaging portions disposed respectively at two opposite sides of said housing portion, said second end portion of said ear hanger being formed with two second engaging portions engaging said first engaging portions, respectively, for connecting said battery set removably to said ear hanger.

30. The Bluetooth earphone as claimed in claim 22, wherein said battery set of said power unit comprises a power-supplying end, and said second end portion of said ear hanger comprises a contact end in electrical contact with said power-supplying end.

31. The Bluetooth earphone as claimed in claim 30, wherein each of said first and second rotating shafts is tubular, and has two open ends, said transmission cable of said power unit extending from said main body and through said first pivot hole, said first rotating shaft, said second pivot hole, and said second rotating shaft to electrically connect with said contact end of said second end portion of said ear hanger.

* * * * *